United States Patent
Li et al.

(10) Patent No.: US 11,481,249 B2
(45) Date of Patent: Oct. 25, 2022

(54) SERVICE MIGRATION METHOD, APPARATUS, AND SERVER THAT ARE USED IN SOFTWARE UPGRADE IN NFV ARCHITECTURE

(71) Applicant: Huawei Technologies Co., Ltd., Shenzhen (CN)

(72) Inventors: Long Li, Shenzhen (CN); Xuewen Gong, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 349 days.

(21) Appl. No.: 15/959,776

(22) Filed: Apr. 23, 2018

(65) Prior Publication Data
US 2018/0246757 A1   Aug. 30, 2018

Related U.S. Application Data

(63) Continuation of application No. PCT/CN2016/080106, filed on Apr. 25, 2016.

(30) Foreign Application Priority Data

Oct. 29, 2015 (CN) .................. 201510715708.X

(51) Int. Cl.
*G06F 9/48* (2006.01)
*H04L 67/00* (2022.01)
(Continued)

(52) U.S. Cl.
CPC ............. *G06F 9/4856* (2013.01); *G06F 8/65* (2013.01); *G06F 8/71* (2013.01); *G06F 9/4401* (2013.01);
(Continued)

(58) Field of Classification Search
CPC .. G06F 9/4856; G06F 9/45558; G06F 9/4401; G06F 8/71; G06F 8/65;
(Continued)

(56) References Cited

U.S. PATENT DOCUMENTS 8,589,940 B2* 11/2013 Lim .................. G06F 9/5077
718/104
8,782,632 B1 7/2014 Chigurapati et al.
(Continued)

FOREIGN PATENT DOCUMENTS

CN   103019847 A   4/2013
CN   104133690 A   11/2014
(Continued)

OTHER PUBLICATIONS

Unknown Author("Communications Unified Inventory Management NFV Orchestration Implementation Guide—Chapter 3 Designing and Onboarding Network Services, VNFs, and PNFs", docs.oracle.com/communications/E88050_01/doc.74/e88928/onboard.htm#UIMIM165, Oct. 16, 2014) (Year: 2014).*
(Continued)

*Primary Examiner* — Lewis A Bullock, Jr.
*Assistant Examiner* — Kevin X Lu
(74) *Attorney, Agent, or Firm* — Leydig, Voit & Mayer, Ltd.

(57) ABSTRACT

The present disclosure discloses a service migration method including: sending, by a VNFM module, a virtual machine VM request command to a first VIM module, where the first VIM module manages a first host on which post-upgrade new-version software is configured; receiving, by the VNFM module, a VM request response from the first VIM module, where the VM request response includes information about a first VM that the first VIM module requests on the first host, and virtual machine own data that can run on the first host and that is configured by the first VIM module is configured on the first VM; and sending, by the VNFM module, a service migration command to a virtualized network function VNF module, where the service migration command is used to instruct the VNF module to migrate a running service on a second VM to the first VM.

19 Claims, 6 Drawing Sheets

(51) Int. Cl.
*G06F 8/65* (2018.01)
*G06F 8/71* (2018.01)
*G06F 9/4401* (2018.01)
*G06F 9/455* (2018.01)
*H04L 67/10* (2022.01)

(52) U.S. Cl.
CPC .......... *G06F 9/45558* (2013.01); *H04L 67/34* (2013.01); *G06F 2009/4557* (2013.01); *G06F 2009/45595* (2013.01); *H04L 67/10* (2013.01)

(58) Field of Classification Search
CPC ... G06F 2009/45595; G06F 2009/4557; G06F 2009/45558; H04L 67/34; H04L 67/10; H04L 67/2814
See application file for complete search history.

(56) References Cited

U.S. PATENT DOCUMENTS

| | | | |
|---|---|---|---|
| 2014/0304698 A1 | 10/2014 | Chigurapati et al. | |
| 2014/0331228 A1 | 11/2014 | Barrat et al. | |
| 2015/0180730 A1* | 6/2015 | Felstaine | H04W 12/084 709/225 |
| 2017/0220371 A1* | 8/2017 | Kosugi | G06F 9/5077 |
| 2018/0191838 A1* | 7/2018 | Friedman | H04L 41/0895 |
| 2019/0273635 A1* | 9/2019 | McNamee | H04W 4/24 |

FOREIGN PATENT DOCUMENTS

| | | | | |
|---|---|---|---|---|
| CN | 104253866 A | | 12/2014 | |
| CN | 104281484 A | | 1/2015 | |
| CN | 104410672 A | * | 3/2015 | ......... H04L 41/0896 |
| CN | 104410672 A | | 3/2015 | |
| CN | 104636159 A | | 5/2015 | |
| CN | 104869023 A | | 8/2015 | |
| CN | 106506186 A | * | 3/2017 | ............. H04L 41/00 |
| JP | 2012185546 A | | 9/2012 | |
| JP | 6197100 B2 | * | 9/2017 | ............... G06F 9/50 |
| WO | 2015135611 A1 | | 9/2015 | |

OTHER PUBLICATIONS

Unknown Author ("OpenMano Openvim API"—Northbound API documentation, version 0.6, Sep. 4, 2015 (Year: 2015).*
Google Search Notes on "openstack resource allocation request" with results limited to before Oct. 29, 2015 (Year: 2015).*
Unknown AUthor, "Upgrade-with-minimum-downtime-OpenStack", Sep. 28, 2011 (Year: 2011).*

* cited by examiner

SERVICE MIGRATION METHOD, APPARATUS, AND SERVER THAT ARE USED IN SOFTWARE UPGRADE IN NFV ARCHITECTURE

CROSS-REFERENCE TO RELATED APPLICATIONS

This application is a continuation of International Application No. PCT/CN2016/080106, filed on Apr. 25, 2016, which claims priority to Chinese Patent Application No. 201510715708.X, filed on Oct. 29, 2015. The disclosures of the aforementioned applications are hereby incorporated by reference in their entireties.

TECHNICAL FIELD

The present disclosure relates to the field of communications technologies, and specifically, to a service migration method, apparatus, and server that are used in a software upgrade in an NFV architecture.

BACKGROUND

As a new architecture, network functions virtualization (NFV) carries a function in a software processing manner by using commodity hardware such as x86 and virtualization technologies, thereby reducing expensive equipment costs in a network application process.

In an actual application, software deployed on a virtualized infrastructure manager (VIM) module and a network functions virtualization infrastructure (NFVI) module in the NFV architecture has a version upgrade requirement. Therefore, new-version software needs to be re-deployed, and a service running on old-version software needs to be migrated to run on the new-version software. There is a relatively high requirement for service reliability in the telecommunications field, and an annual service interruption time is required to be less than five minutes, that is, to meet an availability requirement of five nines. Therefore, a software upgrade in the NFV architecture needs to meet the availability requirement of five nines, that is, to ensure that a service migration in the software upgrade does not interrupt a running service.

Currently, when the new-version software and the old-version software in the NFV architecture meet a compatibility condition, the service migration in the software upgrade may be performed in a manner of a virtual machine live migration. However, when the new-version software and the old-version software do not meet the compatibility condition, after a virtual machine running on the old-version software is migrated to the new-version software, the virtual machine cannot run normally. As a result, a service on the virtual machine cannot run normally, and consequently, the service on the virtual machine is interrupted.

SUMMARY

The present disclosure provides a service migration method that is used in a software upgrade in an NFV architecture. Regardless of whether new-version software and old-version software in an upgrade meet a compatibility condition, the present disclosure can help ensure that a service migrated in the software upgrade can run normally and continuously.

To resolve the foregoing technical problem, the following technical solutions are used in the present disclosure.

A first aspect of the present disclosure provides a service migration method that is used in a software upgrade in an NFV architecture. The method includes:

in a software upgrade process, sending, by a virtualized network function manager VNFM module that is located at an upper layer of an infrastructure layer that is at a bottommost layer in the NFV architecture, a virtual machine VM request command to a first virtualized infrastructure manager VIM module that is located at the bottommost layer, where the command is used to instruct the first VIM module to request a virtual machine; and the software upgrade may be classified into two cases, one case is that the first VIM module undergoes a software upgrade and a virtualized network function infrastructure correspondingly managed by the first VIM module also undergoes a software upgrade, the other case is that the virtualized network function infrastructure correspondingly managed by the first VIM module undergoes a software upgrade but the first VIM module does not undergo a software upgrade, and the two cases may be summarized as that the first VIM module manages a first host Host on which post-upgrade new-version software is configured;

receiving, by the VNFM module, a VM request response from the first VIM module, where the request response carries information about a VM that the first VIM module requests based on a request of the VNFM module, which is specifically information about a first VM that the first VIM module requests on the first host Host, and virtual machine own data that can run on the first host and that is configured by the first VIM module is configured on the first VM; when the first VIM module requests the first VM, the virtual machine own data may be configured for the first VM, so that the first VM can run on the first host, that is, so that the VM obtained by means of requesting adapts to the upgraded software; and the configured virtual machine own data includes data other than service data running on the virtual machine, for example, environment configuration parameter data; and after the first VIM module obtains, by means of requesting, the VM that is adaptable to the upgraded software, and notifies the VNFM module, sending, by the VNFM module, a service migration command to a virtualized network function VNF module, where the service migration command is used to instruct the VNF module to migrate a running service on a second VM to the first VM, and the second VM is deployed on a second host on which pre-upgrade old-version software is configured.

In the technical solution provided in the first aspect of embodiments of the present disclosure, the VNFM module at an intermediate layer instructs the first VIM module at the bottom layer to request the first VM and configure the first VM module, so that the virtual machine own data that can run on the first host on which the post-upgrade new-version software is configured is configured on the first VM, and then the VNF module migrates the service to the first VM. Because the first VIM module configures the virtual machine own data based on a software upgrade status when requesting the VM, even if a pre-upgrade software version and a post-upgrade software version are not compatible, it can be ensured that the virtual machine own data of the requested virtual machine meets a requirement of the upgraded software. Therefore, the newly requested virtual machine can run normally, and further, the service migration can still be implemented even if the virtual machine cannot run normally. This helps ensure that the service migrated in the software upgrade runs normally and continuously, and even that the service is not interrupted.

In the solution provided in the first aspect of the present disclosure, the virtual machine request command that is sent by the VNFM module to the first VIM module may include a virtual machine specification parameter that is used to instruct the first VIM module to request a virtual machine according to the specification parameter. The specification parameter may be, for example, a memory size or a quantity of CPUs.

In addition, in the solution provided in the first aspect of the present disclosure, the migration of the running service by the VNF module may be specifically a migration of service data by the VNF module. The service data specifically includes database data of the service and message data of the service. The VNF module may specifically migrate the running service by means of active/standby switchover, service distribution, protocol adjustment, or the like.

According to the solution provided in the first aspect of the present disclosure, the method further includes:

after the VNFM module receives a service migration completion notification from the VNF module, releasing, by the VNFM module, the second VM, to avoid a waste of idle resources.

In a scenario in which both software deployed on a VIM module and software deployed on any host on an NFVI module managed by the VIM module have a version upgrade requirement, the post-upgrade new-version software is configured on the first VIM module, and the second host is managed by a second VIM module on which the pre-upgrade old-version software is configured.

In this scenario, before the VNFM module sends the service migration command to the virtualized network function VNF module, the method further includes:

sending, by the VNFM module, a virtual machine query command to the second VIM module, where the virtual machine query command is used to instruct the second VIM module to query information about the second VM that is running a service of the VNF module.

Specifically, because the service of the VNF module is currently running on a VM on the second host managed by the second VIM module, the VNFM module obtains the information about the second VM by instructing the second VIM module to query the VM that is running the service of the VNF module. The VNFM module sends a virtual machine query command that carries an identifier of the VNF module to the second VIM module. The second VIM module queries, according to the identifier of the VNF module, information about the VM that is running the service of the VNF module.

After obtaining the information about the second VM and the information about the first VM, the VNFM module sends a service migration command that carries the information about the second VM and the information about the first VM to the VNF module.

In this case, the post-upgrade new-version software configured on the first VIM module and the pre-upgrade old-version software configured on the second VIM module are homogeneous software or heterogeneous software. The homogeneous software is software of a same type. A homogeneous software upgrade is an upgrade between software of a same type. For example, an upgrade between OpenStack software of two versions is a homogeneous software upgrade, and an upgrade between OpenStack software and VMWare software is a heterogeneous software upgrade.

In this case, the post-upgrade new-version software configured on the first host and the pre-upgrade old-version software configured on the second host may also be homogeneous software or heterogeneous software.

In this case, an EMS module may be used as a forwarding module. Specifically, the VNFM module sends the service migration command to the element management system EMS module, so that the EMS module forwards the service migration command to the VNF module, where the EMS module is configured to manage the VNF module.

The foregoing case can implement that in the scenario in which both software deployed on a VIM module and software deployed on any host on an NFVI module managed by the VIM module have a version upgrade requirement, because the VIM module configures the virtual machine own data based on a software upgrade status when requesting the VM, even if a pre-upgrade software version and a post-upgrade software version are not compatible, it can be ensured that the virtual machine own data of the requested virtual machine meets a requirement of the upgraded software. Therefore, the newly requested virtual machine can run normally, and further, the service migration can still be implemented even if the virtual machine cannot run normally. This helps ensure that the service migrated in the software upgrade runs normally and continuously.

In a scenario in which software deployed on a VIM module is not upgraded and only software deployed on any host on an NFVI module managed by the VIM module has a version upgrade requirement, the second host is managed by the first VIM module.

In this scenario, before the VNFM module sends the service migration command to the virtualized network function VNF module, the method further includes:

sending, by the VNFM module, a virtual machine query command to the first VIM module, where the virtual machine query command is used to instruct the first VIM module to query information about the second VM that is running a service of the VNF module.

Specifically, because the service of the VNF module is currently running on a VM on the second host managed by the first VIM module, the VNFM module obtains the information about the second VM by instructing the first VIM module to query the VM that is running the service of the VNF module. The VNFM module sends a virtual machine query command that carries an identifier of the VNF module to the first VIM module. The first VIM module queries, according to the identifier of the VNF module, information about the VM that is running the service of the VNF module.

After obtaining the information about the second VM and the information about the first VM, the VNFM module sends a service migration command that carries the information about the second VM and the information about the first VM to the VNF module.

In this case, the post-upgrade new-version software configured on the first host and the pre-upgrade old-version software configured on the second host may be homogeneous software or heterogeneous software.

In this case, an EMS module may also be used as a forwarding module. Specifically, the VNFM module sends the service migration command to the element management system EMS module, so that the EMS module forwards the service migration command to the VNF module, where the EMS module is configured to manage the VNF module.

The foregoing case can implement that in the scenario in which both software deployed on a VIM module and software deployed on any host on an NFVI module managed by the VIM module have a version upgrade requirement, because the VIM module configures the virtual machine own data based on a software upgrade status when requesting the VM, even if a pre-upgrade software version and a post-upgrade software version are not compatible, it can be ensured that the virtual machine own data of the requested virtual machine meets a requirement of the upgraded software. Therefore, the newly requested virtual machine can run normally, and further, the service migration can still be implemented even if the virtual machine cannot run normally. This helps ensure that the service migrated in the software upgrade runs normally and continuously.

A second aspect of the present disclosure provides a service migration apparatus that is used in a software upgrade in an NFV architecture. The apparatus is configured to implement the foregoing service migration method that is used in a software upgrade in an NFV architecture and that is provided in the first aspect.

A third aspect of the present disclosure provides a service migration server that is used in a software upgrade in an NFV architecture. The server includes a memory and a processor. The memory is configured to store program code and transmit the program code to the processor. The processor is configured to perform, according to an instruction in the program code, steps of the foregoing service migration method that is used in a software upgrade in an NFV architecture and that is provided in the first aspect.

A fourth aspect of the present disclosure provides a computer storage medium that is configured to store a computer program. The computer program instructs relevant hardware to perform the following steps: sending a virtual machine VM request command to a first virtualized infrastructure manager VIM module, where the first VIM module manages a first host Host on which post-upgrade new-version software is configured; receiving a VM request response from the first VIM module, where the VM request response includes information about a first VM that the first VIM module requests on the first host Host, and virtual machine own data that can run on the first host and that is configured by the first VIM module is configured on the first VM; and sending a service migration command to a virtualized network function VNF module, where the service migration command is used to instruct the VNF module to migrate a running service on a second VM to the first VM, and the second VM is deployed on a second host on which pre-upgrade old-version software is configured.

In the solution provided in the fourth aspect of the present disclosure, the computer program may further instruct the relevant hardware to perform each step of the foregoing service migration method that is used in a software upgrade in an NFV architecture and that is provided in the first aspect.

BRIEF DESCRIPTION OF DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure, and ordinary persons skilled in the art may still derive other drawings from these accompanying drawings.

DESCRIPTION OF EMBODIMENTS

In order to make persons skilled in the art to better understand the solutions in the present disclosure, the following further describes the embodiments of the present disclosure in detail with reference to accompanying drawings and implementations.

Figure 1:
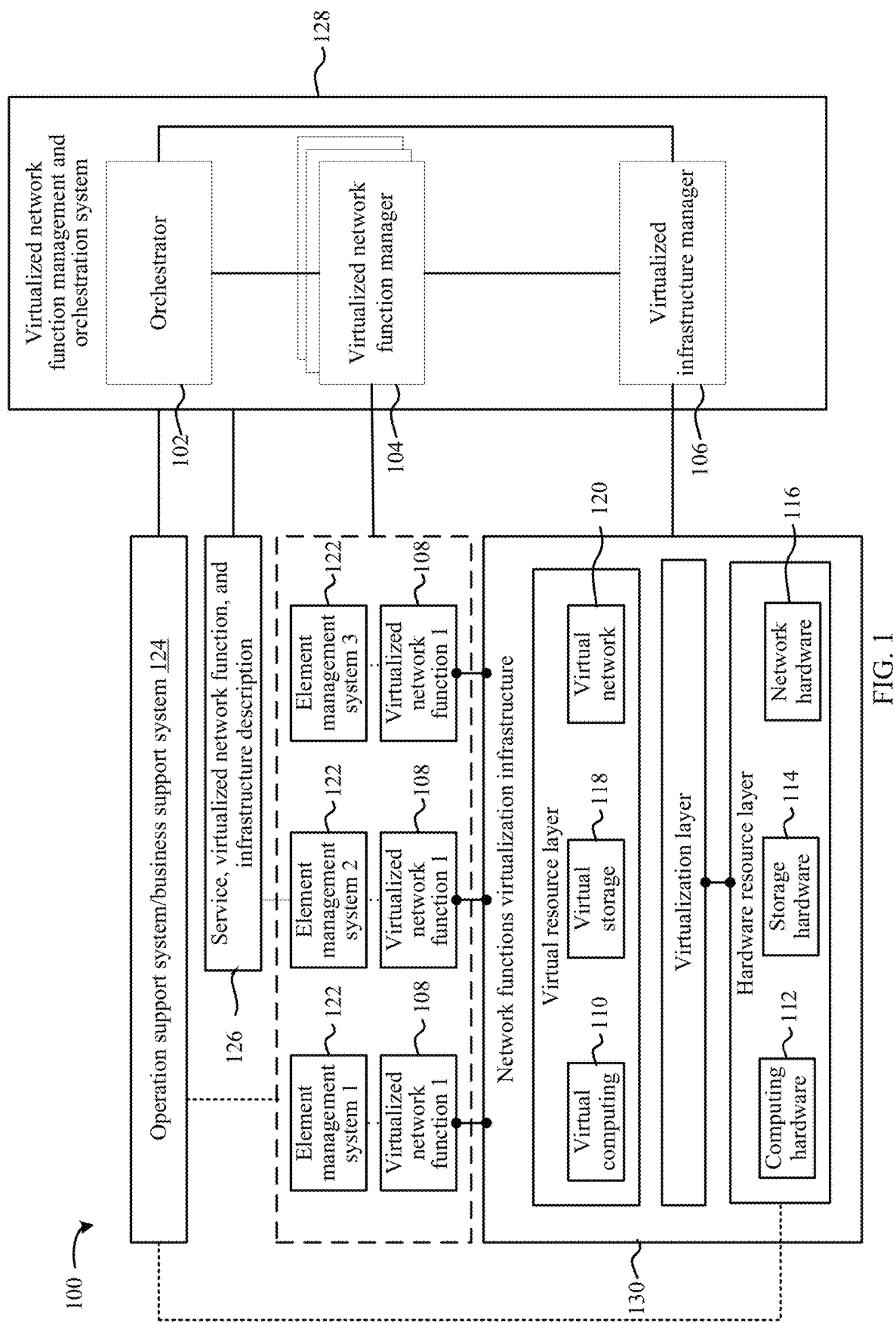
FIG. 1 is a schematic system architecture diagram of an NFV system 100 according to an embodiment of the present disclosure.

Referring to FIG. 1, FIG. 1 is a schematic system architecture diagram of a network functions virtualization NFV system 100 according to an embodiment of the present disclosure.

First, learn an NFV architecture from a vertical direction and a horizontal direction. According to design of the NFV architecture, the NFV architecture is divided into three layers from the vertical direction.

An infrastructure layer at a bottommost layer: From a cloud computing perspective, a network functions virtualization infrastructure NFVI 130 is a resource pool. The NFVI 130 includes hardware and software, which jointly establish a virtualized environment to deploy, manage, and execute a virtualized network function VNF 108. In other words, a hardware resource layer and a virtual resource layer are configured to provide the VNF 108 with virtual resources such as a virtual machine and/or a virtual container in another form. A physical infrastructure of the NFVI is a plurality of geographically dispersed data centers that are connected by using a high-speed communications network. The NFVI needs to respectively convert computing hardware 112, storage hardware 114, and network hardware 116 into virtual computing 110, virtual storage 118, and a virtual network 120 by using a virtualization layer. Virtualization of the network hardware may be implemented by using a technology such as a virtual LAN (VLAN), a virtual private LAN service (VPLS), a virtual extensible local area network (VxLAN), or network virtualization using generic routing encapsulation (NVGRE).

A virtual network layer at an intermediate layer: The virtual network layer is corresponding to each current telecommunication service network. Each physical network element is mapped to one virtualized network function VNF. Resources required by the VNF need to be decomposed into virtual computing/storage/network resources, which are carried by the NFVI. The VNF 108 is virtualization of at least one network function, and the network function is previously provided by a physical network device. In an implementation, the VNF 108 may be a virtualized mobility management entity (MME) node, configured to provide all network functions provided by a typical non-virtualized MME device. In another implementation, the VNF 108 may be configured to implement functions of some components in all components provided by a non-virtualized MME device. One or more VNFs 108 may be deployed on one virtual machine (or a virtual container in another form). An EMS 122 may be configured to manage one or more VNFs.

An operation support layer at a topmost layer: An operation support system/business support system (OSS/BSS) 124 is mainly designed for a telecommunication service operator, and provides integrated network management and business operation functions, including network management (for example, fault monitoring or network information collection), billing management, customer service management, and the like.

A service, virtualized network function, and infrastructure description system 126 is described in detail in the ETSI GS NFV 002 v1.1.1 standard, and is not described herein in this embodiment of the present disclosure.

Second, the NFV architecture is divided into two layers in the horizontal direction.

A service network domain on the left: The service network domain is each current telecommunication service network.

A management and orchestration domain on the right: A virtualized network function management and orchestration system (MANO) 128 is responsible for management and orchestration of entire NFVI resources, responsible for mapping and association between a service network and an NFVI resource, responsible for implementation of an OSS service resource procedure, and the like. The MANO internally includes an orchestrator 102, one or more VNF managers (VNFM) 104, and one or more virtualized infrastructure managers (VIM) 106, which complete management of three layers of an NetworkService (NS) layer, i.e. a network service provided by a service network, a VNF layer, and an NFVI layer, respectively. The VNF manager 104 may communicate with the VNF 108 and the EMS 122 to perform VNF lifecycle management and implement exchange of configuration/status information. The VNFM 104 may further be configured to manage one or more VNFs 108, and implement various management functions, for example, initializing, updating, querying, and/or terminating the VNF 108. The virtualized infrastructure manager 106 may be configured to control and manage interaction between the VNF 108 and the computing hardware 112, the storage hardware 114, the network hardware 116, the virtual computing 110, the virtual storage 118, and the virtual network 120. For example, the virtualized infrastructure manager 106 may be configured to perform an operation of allocating a resource to the VNF 108. The VNFM 104 and the virtualized infrastructure manager 106 may mutually communicate to exchange configuration information and status information of a virtualized hardware resource. The orchestrator 102 may communicate with one or more VNF managers 104 to implement resource-related requests, send configuration information to the VNF manager 104, and collect status information of the VNF 108. In addition, the orchestrator 102 may further communicate with the virtualized infrastructure manager 106 to implement resource allocation, and/or implement reservation and exchange of the configuration information and status information of the virtualized hardware resource.

This embodiment of the present disclosure may include the following several cases according to different software upgrade objects.

1. Both software deployed on a VIM module and software deployed on any host on an NFVI module managed by the VIM module have a version upgrade requirement.

In this case, in this embodiment of the present disclosure, a first VIM module is a VIM on which post-upgrade new-version software is installed, and a second VIM module is a VIM on which pre-upgrade old-version software is installed. A first VM is managed by the first VIM module, and a second VM is managed by the second VIM module.

The pre-upgrade old-version software and the post-upgrade new-version software that are deployed on the VIM modules may be homogeneous software, or may be heterogeneous software. The following uses the homogeneous software as an example for description.

Figure 2:
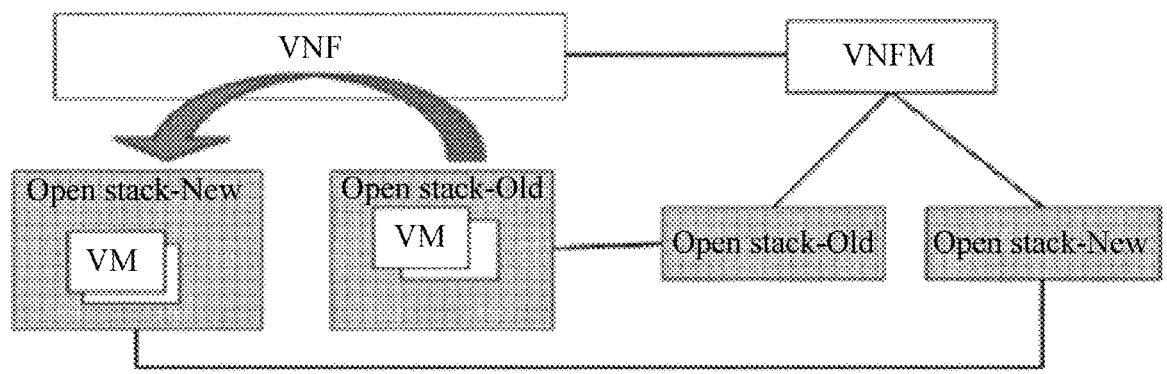
FIG. 2 is a schematic architecture diagram of an upgrade between VIM modules with homogeneous software according to an embodiment of the present disclosure.

As shown in FIG. 2, FIG. 2 is a schematic architecture diagram of an upgrade between VIM modules with homogeneous software according to an embodiment of the present disclosure. A VNFM module sends a virtual machine request command to a first VIM module on which post-upgrade new-version OpenStack software is installed. The first VIM module requests a first VM on a first host Host on which the post-upgrade new-version OpenStack software is installed, and configures, for the first VM, virtual machine own data that can run on the first host. The VNFM module can also send a virtual machine query command to a second VIM module on which pre-upgrade old-version OpenStack software is installed. The second VIM module finds, by means of querying, a second VM on a second host on which the pre-upgrade old-version OpenStack software is installed. The VNFM module sends a service migration command to a VNF module, to instruct the VNF module to migrate a running service on the second VM to the first VM.

Figure 3:
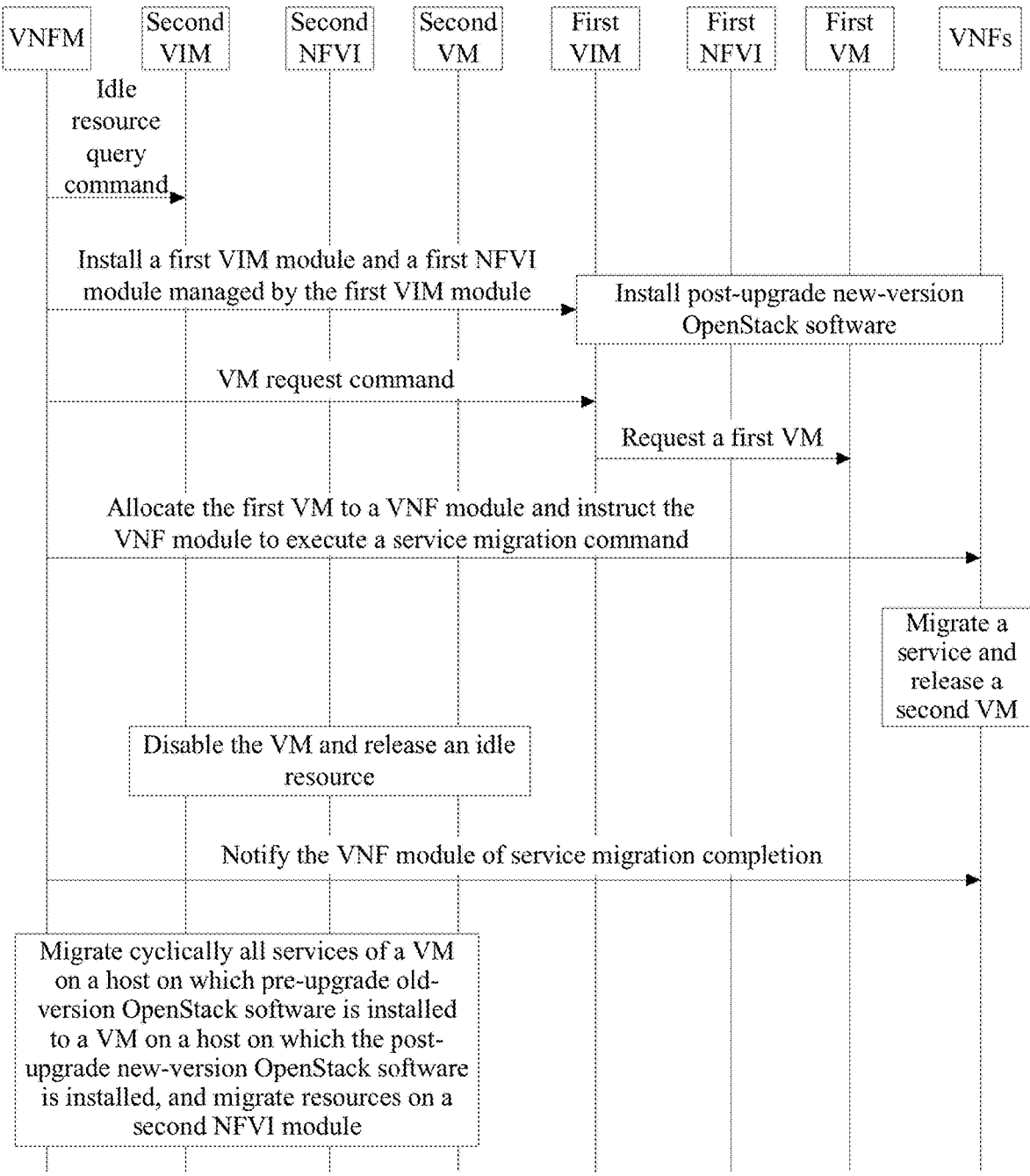
FIG. 3 is a signaling interaction diagram of a service migration method that is used in an upgrade between VIM modules with homogeneous software in an NFV architecture, according to an embodiment of the present disclosure.

For FIG. 2, an embodiment of the present disclosure further provides a signaling interaction diagram of a service migration method that is used in an upgrade between VIM modules with homogeneous software in an NFV architecture, as shown in FIG. 3.

S301: A VNFM module sends an idle resource query command to a second VIM module, and the second VIM module queries whether there is an idle resource at present.

S302: When learning that there is an idle resource at present, the VNFM module installs a first VIM module and a first NFVI module managed by the first VIM module, and establishes a message interface with the first VIM module.

S303: Install post-upgrade new-version OpenStack software on the first VIM module and the first NFVI module.

S304: The VNFM module sends a virtual machine request command to the first VIM module, where the virtual machine request command is used to instruct the first VIM module to request a first VM on a first host that is on the first NFVI module managed by the first VIM module.

S305: The first VIM module requests, according to the virtual machine request command, the first VM on the first host that is on the first NFVI module.

After obtaining the first VM by means of requesting, the first VIM module configures, for the first VM, virtual machine own data that can run on the first host. The virtual machine own data configured for the first VM includes data other than service data running on the first VM, for example, environment configuration parameter data.

Specifically, the virtual machine request command that is sent by the VNFM module to the first VIM module includes a specification parameter indicating a virtual machine requested by the first VIM module, for example, a memory size or a quantity of CPUs. After requesting the first VM that can meet the specification parameter, the first VIM module configures, for the first VM according to an environmental parameter of the post-upgrade new-version software currently deployed on the first host, the virtual machine own data that can run on the first host, and starts the first VM.

S306: The VNFM module allocates the first VM to a VNF module and instructs the VNF module to execute a service migration command. The service migration command includes information about the first VM and information about a second VM, and is specifically used to instruct the VNF module to migrate a running service on the second VM to the first VM.

In an actual application, before the VNFM module sends the service migration command to the VNF module, the VNFM module first sends a virtual machine query command to the second VIM module. Specifically, because a service of the VNF module is currently running on a VM on a second host managed by the second VIM module, the VNFM module obtains the information about the second VM by instructing the second VIM module to query the VM that is running the service of the VNF module.

Specifically, the VNFM module sends a virtual machine query command that carries an identifier of the VNF module to the second VIM module. The second VIM module queries, according to the identifier of the VNF module, information about the VM that is running the service of the VNF module.

S307: The VNF module migrates, according to the service migration command, the running service on the second VM to the first VM.

Because the virtual machine own data that can run on the first host on which the post-upgrade new-version software is installed is configured for the first VM, it can be ensured that a service can run on the first VM normally. When the VNF module migrates the running service to the first VM, it can also be ensured that the running service is not interrupted. In this embodiment of the present disclosure, the migration of the running service by the VNF module is essentially also a migration of data included in the service. The data of the service specifically includes database data of the service and message data of the service.

In an actual application, the VNF module may implement the migration of the running service by means of active/standby switchover, service distribution, or protocol adjustment.

S308: After receiving a notification that the VNF module finishes migrating the running service on the second VM to the first VM, the VNFM module disables the second VM and releases an idle resource.

In an actual application, services of a VNF module may run on a plurality of VMs on a host, or may run on a plurality of VMs on a plurality of hosts. The foregoing steps S304 to S308 are cyclically performed to gradually migrate the services of the VNF module to a VM on which the post-upgrade new-version software is configured, so as to complete the migration of the services of the VNF module.

S309: When all services of the VNF module are migrated, the VNFM module notifies the VNF module of service migration completion.

Services of another VNF module that runs in a pre-upgrade old-version software environment may also be hitlessly migrated by cyclically performing steps S304 to S309. After all VMs on a host on a second NFVI module complete a service migration, computing resources, storage resources, network resources, and the like of the second NFVI module are also migrated to the first NFVI module. In addition, resources of the second VIM module may also be released.

Figure 4:
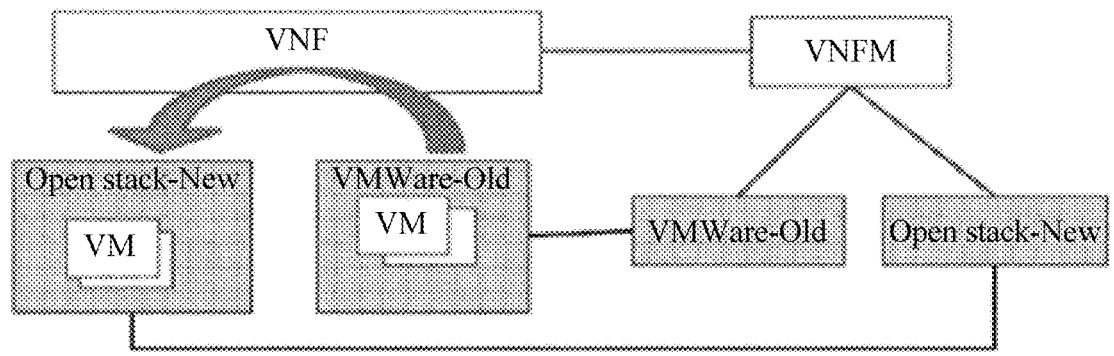
FIG. 4 is a schematic architecture diagram of an upgrade between VIM modules with heterogeneous software according to an embodiment of the present disclosure.

An embodiment of the present disclosure further provides a service migration method that is used in an upgrade between VIM modules with heterogeneous software in an NFV architecture. As shown in FIG. 4, FIG. 4 is a schematic architecture diagram of an upgrade between VIM modules with heterogeneous software according to an embodiment of the present disclosure. A process of an upgrade between VIM modules with heterogeneous software is basically the same as a process of an upgrade between VIM modules with homogeneous software, and only differs in that in S303 in FIG. 3, post-upgrade new-version software installed on the first VIM module and the first NFVI module is VMWare software. The VMWare software and the OpenStack software are different types of software. Therefore, an upgrade between the VMWare software and the OpenStack software is a heterogeneous software upgrade. In this embodiment of the present disclosure, the OpenStack software or the VMWare software installed on the first VIM module, the second VIM module, the first NFVI module, and the second NFVI module exists only as a common software type, and does not limit a scope of this embodiment of the present disclosure.

2. Software deployed on a VIM module does not have an upgrade requirement, and only software deployed on any host on an NFVI module managed by the VIM module has a version upgrade requirement.

In this case, in this embodiment of the present disclosure, a VIM module related before and after software deployed on a host is upgraded is a first VIM module, and both a first VM and a second VM are managed by the first VIM module. However, the first VM is a VM deployed on a first host on which post-upgrade new-version software is installed, and the second VM is a VM deployed on a second host on which pre-upgrade old-version software is installed.

Figure 5:
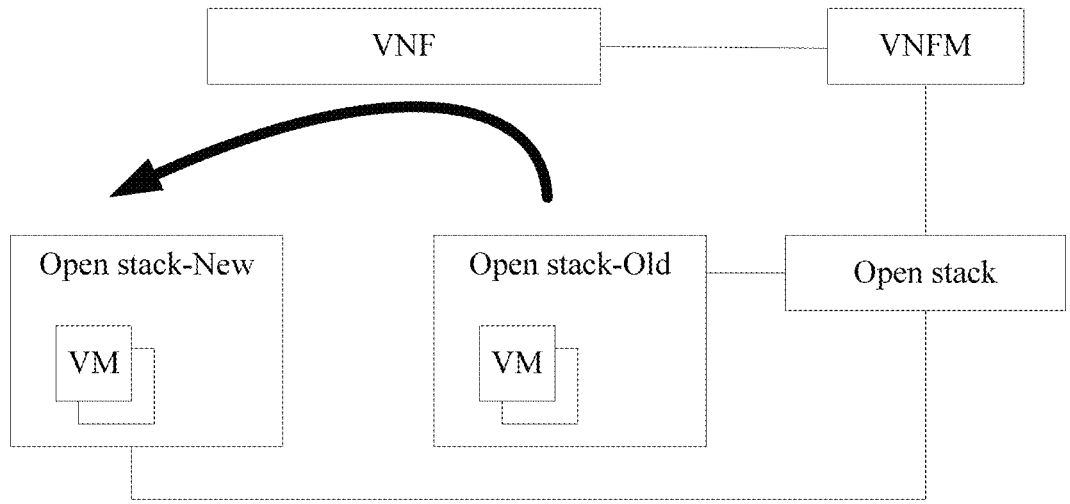
FIG. 5 is a schematic diagram of an architecture in which software deployed on a VIM module is not upgraded and only software deployed on a host is upgraded, according to an embodiment of the present disclosure.

As shown in FIG. 5, FIG. 5 is a schematic diagram of an architecture in which software deployed on a VIM module is not upgraded and only software deployed on a host is upgraded, according to an embodiment of the present disclosure.

A VNFM module sends a virtual machine request command to a first VIM module. The first VIM module requests a first VM on a first host Host on which post-upgrade new-version OpenStack software is installed, and configures, for the first VM, virtual machine own data that can run on the first host. The VNFM module can also send a virtual machine query command to the first VIM module. The first VIM module finds, by means of querying, a second VM on a second host on which pre-upgrade old-version OpenStack software is installed. The VNFM module sends a service migration command to a VNF module, to instruct the VNF module to migrate a running service on the second VM to the first VM.

Figure 6:
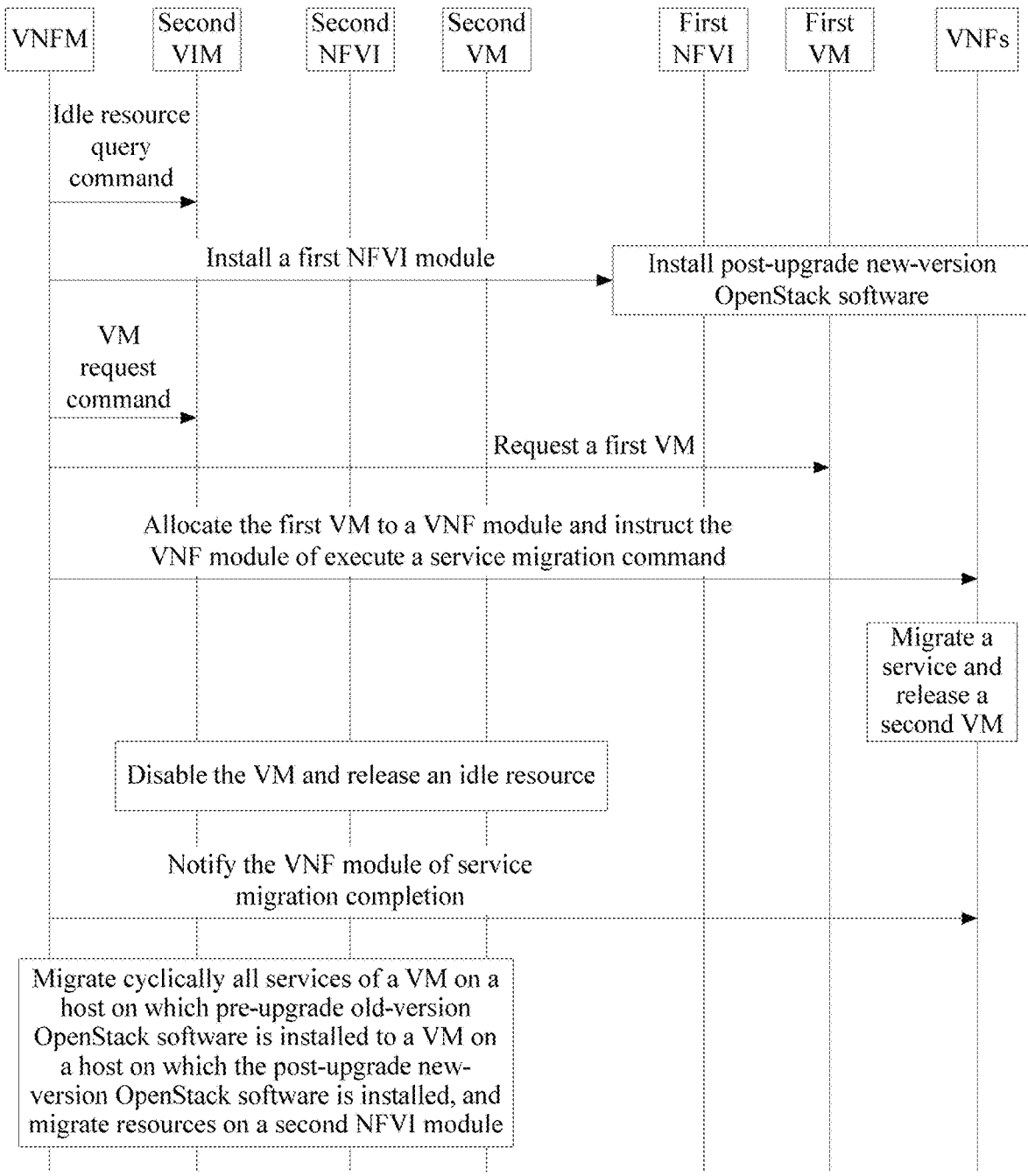
FIG. 6 is a signaling interaction diagram of a method used when software deployed on a VIM module is not upgraded and only software deployed on a host is upgraded, according to an embodiment of the present disclosure.

For FIG. 5, an embodiment of the present disclosure further provides a signaling interaction diagram of a method used when software deployed on a VIM module is not upgraded and only software deployed on a host is upgraded, as shown in FIG. 6. For details, refer to an understanding of FIG. 3.

S601: A VNFM module sends an idle resource query command to a first VIM module, and the first VIM module queries whether there is an idle resource at present.

S602: When learning that there is an idle resource at present, the VNFM module installs a first NFVI module, where the first NFVI module is managed by the first VIM module.

S603: Install post-upgrade new-version OpenStack software on the first NFVI module.

S604: The VNFM module sends a virtual machine request command to the first VIM module, where the virtual machine request command is used to instruct the first VIM module to request a first VM on a first host that is on the first NFVI module managed by the first VIM module.

S605: The first VIM module requests, according to the virtual machine request command and on the first host that is on the first NFVI module, the first VM on which virtual machine own data that can run on the first host is configured, and starts the first VM.

S606: The VNFM module allocates the first VM to a VNF module and instructs the VNF module to execute a service migration command. The service migration command includes information about the first VM and information about a second VM, and is specifically used to instruct the VNF module to migrate a running service on the second VM to the first VM.

S607: The VNF module migrates, according to the service migration command, the running service on the second VM to the first VM.

In an actual application, before the VNFM module sends the service migration command to the VNF module, the VNFM module first sends a virtual machine query command to the first VIM module. Specifically, because a service of the VNF module is currently running on a VM on a second host managed by the first VIM module, the VNFM module obtains the information about the second VM by instructing the first VIM module to query the VM that is running the service of the VNF module.

Specifically, the VNFM module sends a virtual machine query command that carries an identifier of the VNF module to the first VIM module. The first VIM module queries, according to the identifier of the VNF module, information about the VM that is running the service of the VNF module.

S608: After receiving a notification that the VNF module finishes migrating the running service on the second VM to the first VM, the VNFM module disables the second VM and releases an idle resource.

S609: When all services of the VNF module are migrated, the VNFM module notifies the VNF module of service migration completion.

Services of another VNF module that runs in a pre-upgrade old-version software environment may also be hitlessly migrated by cyclically performing steps S604 to S609. After all VMs on a host on a second NFVI module complete a service migration, computing resources, storage resources, network resources, and the like of the second NFVI module are also migrated to the first NFVI module.

In addition, the VIM module in the VNF architecture may manage a plurality of NFVI modules. Therefore, the first NFVI module and the second NFVI module may be two different NFVI modules both managed by the first VIM module, or may be the same NFVI module managed by the first VIM module.

In the service migration method that is used in a software upgrade in an NFV architecture and that is provided in this embodiment of the present disclosure, because the virtual machine own data that can run on the first host on which the post-upgrade new-version software is configured is configured on the first VM that the VNFM module instructs the first VIM module to request, it can be ensured that the service migrated by the VNF module to the first VM runs without being interrupted. Even if the new-version software and the old-version software do not meet a compatibility condition, this embodiment of the present disclosure can still implement that the service migration in the software upgrade does not interrupt a service that runs normally.

Actually, in the service migration method that is used in a software upgrade in an NFV architecture and that is provided in this embodiment of the present disclosure, because the virtual machine own data that can run on the first host on which the post-upgrade new-version software is configured is configured on the first VM that the first VIM module requests, the service migrated to the first VM can run without being interrupted, and the service migration in this embodiment of the present disclosure does not have a problem that the new-version software and the old-version software are not compatible. That is, regardless of whether the new-version software and the old-version software are compatible, this embodiment of the present disclosure helps ensure that the service migrated in the software upgrade can run normally and continuously, and even that the service is not interrupted.

The VNFM module may communicate with the VNF module and an EMS module, and the EMS module is configured to manage the VNF module. Therefore, in this embodiment of the present disclosure, the EMS module is used as a forwarding module. After the VNFM module sends the service migration command to the element management system EMS module that is configured to manage the VNF module, the EMS module forwards the received service migration command to the VNF module. Other procedures in this specific application in which the EMS module is used to forward the service migration command may be understood with reference to FIG. 2 to FIG. 6.

Figure 7:
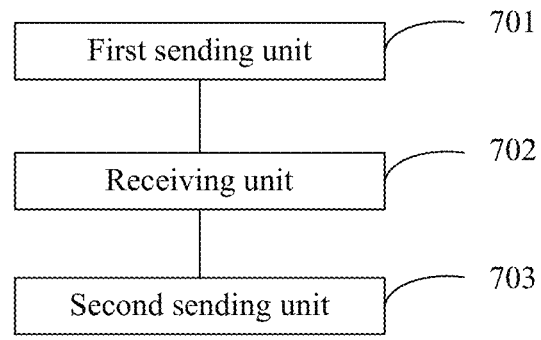
FIG. 7 is a schematic structural diagram of a service migration apparatus that is used in a software upgrade in an NFV architecture, according to an embodiment of the present disclosure.

An embodiment of the present disclosure further provides a service migration apparatus that is used in a software upgrade in an NFV architecture. For an embodiment of the apparatus, refer to descriptions in the method embodiments. FIG. 7 is a schematic structural diagram of a service migration apparatus that is used in a software upgrade in an NFV architecture, according to an embodiment of the present disclosure. The apparatus includes:

a first sending unit 701, configured to send a virtual machine VM request command to a first virtualized infrastructure manager VIM module, where the first VIM module manages a first host Host on which post-upgrade new-version software is configured;

a receiving unit 702, configured to receive a VM request response from the first VIM module, where the VM request response includes information about a first VM that the first VIM module requests on the first host Host, and virtual machine own data that can run on the first host is configured on the first VM; and a second sending unit 703, configured to send a service migration command to a virtualized network function VNF module, where the service migration command is used to instruct the VNF module to migrate a running service on a second VM to the first VM, and the second VM is deployed on a second host on which pre-upgrade old-version software is configured.

In the service migration apparatus that is used in a software upgrade in an NFV architecture and that is provided in this embodiment of the present disclosure, because the virtual machine own data that can run on the first host on which the post-upgrade new software is installed is configured on the first VM that the first sending unit instructs the first VIM module to request, the service migrated by the VNF module to the first VM can run without being interrupted. Even if the new-version software and the old-version software in the software upgrade do not meet a compatibility condition in the foregoing application scenario, this embodiment of the present disclosure can still implement that the service migration in the software upgrade does not interrupt a service that runs normally.

In an implementation scenario, to resolve a problem that both software deployed on a VIM module and software deployed on any host on an NFVI module managed by the VIM module have a version upgrade requirement, in this embodiment of the present disclosure, the first VIM module is a VIM on which the post-upgrade new-version software is installed, a second VIM module is a VIM on which the pre-upgrade old-version software is installed, and the software deployed on the VIM modules may be homogeneous software or heterogeneous software. The first VM is managed by the first VIM module, and the second VM is managed by the second VIM module. The first VM is a VM deployed on the first host on which the post-upgrade new-version software is installed, the second VM is a VM deployed on the second host on which the pre-upgrade old-version software is installed, and the software deployed on the hosts may also be homogeneous software or heterogeneous software. An apparatus embodiment in the foregoing implementation scenario may be understood with reference to FIG. 2, FIG. 3, and FIG. 4 in the method embodiments.

In this implementation scenario, based on an apparatus structure in FIG. 7, the apparatus further includes a first query unit, configured to send a virtual machine query command to the first VIM module, where the virtual machine query command is used to instruct the first VIM module to query information about the second VM that is running a service of the VNF module.

In another implementation scenario, to resolve a problem that software deployed on a VIM module does not have an upgrade requirement and only software deployed on any host on an NFVI module managed by the VIM module has a version upgrade requirement, in this embodiment of the present disclosure, a VIM module related before and after software deployed on a host is upgraded is the first VIM module, and both the first VM and the second VM are managed by the first VIM module. However, the first VM is a VM deployed on the first host on which the post-upgrade new-version software is installed, and the second VM is a VM deployed on the second host on which the pre-upgrade old-version software is installed. An apparatus embodiment in this implementation scenario may be understood with reference to FIG. 5 and FIG. 6 in the method embodiments.

In this implementation scenario, based on an apparatus structure in FIG. 7, the apparatus further includes a second query unit, configured to send a virtual machine query command to the second VIM module, where the virtual machine query command is used to instruct the second VIM module to query information about the second VM that is running a service of the VNF module.

To reduce a waste of resources, on a basis of the apparatus structure in FIG. 7, the apparatus further includes:

a release unit, configured to: after a service migration completion notification from the VNF module is received, release the second VM.

In another implementation, an EMS module is used as a forwarding module of the service migration command. In this implementation, on the basis of the apparatus structure in FIG. 7, the apparatus further includes a second sending unit, specifically configured to send the service migration command to the element management system EMS module, so that the EMS module forwards the service migration command to the VNF module, where the EMS module is configured to manage the VNF module.

Figure 8:
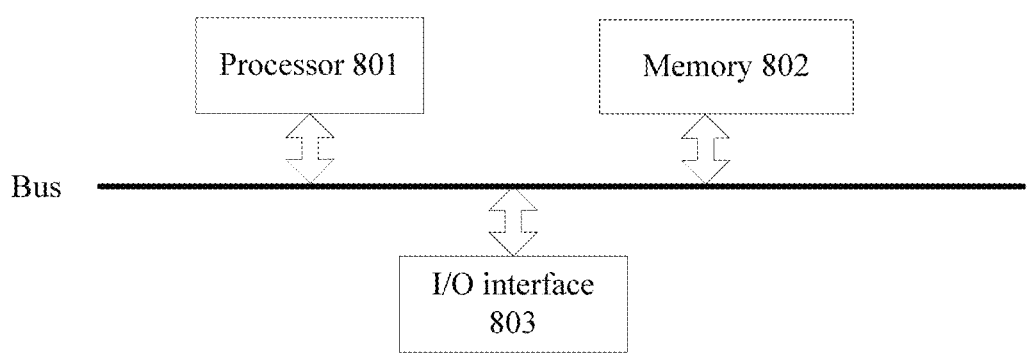
FIG. 8 is a schematic structural diagram of a service migration server that is used in a software upgrade in an NFV architecture, according to an embodiment of the present disclosure.

FIG. 8 is a schematic structural diagram of a service migration server that is used in a software upgrade in an NFV architecture, according to an embodiment of the present disclosure. As shown in FIG. 8, the server includes a processor 801 and a memory 802, and further includes an I/O interface 803. The processor and the memory are connected by using a bus. The memory stores program code and transmits the program code to the processor. The processor invokes and executes an instruction in the memory, to implement the foregoing service migration method that is used in a software upgrade in an NFV architecture. The I/O interface is configured to communicate with a first VIM module and a VNF module.

For technical principles and technical effects of the server in this embodiment of the present disclosure, refer to related descriptions in the embodiments shown in FIG. 1 to FIG. 7. Details are not described herein again.

It may be clearly understood by persons skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of hardware in addition to a software functional unit.

The foregoing integrated unit implemented in a form of a software functional unit may be stored in a computer-readable storage medium. The software functional unit is stored in a storage medium and includes several instructions for instructing a computer device (which may be a personal computer, a server, a network device, or the like) to perform some of the steps of the methods described in the embodiments of the present disclosure. The foregoing storage medium includes: any medium that can store program code, such as a removable hard disk, a read-only memory (ROM), a random access memory (RAM), a magnetic disk, or an optical disc.

Finally, it should be noted that the foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some technical features thereof, without departing from the protection scope of the technical solutions of the embodiments of the present disclosure.

What is claimed is:

1. A service migration method in a network functions virtualization (NFV) architecture, the method comprising:
   determining, by a virtualized network function manager (VNFM), existence of an idle resource in the NFV architecture, wherein the NFV architecture includes a second virtualized infrastructure manager (VIM) managing a second network functions virtualization infrastructure (NFVI), wherein the second VIM and second NFVI are running a second software;
   in response to determining existence of the idle resource, installing, by the VNFM, a first VIM and a first NFVI on the idle resource, wherein the first VIM manages the first NFVI, and the installing includes installing a first software on the first VIM and the first NFVI, and wherein the first software is an upgraded version of the second software;
   sending, by the VNFM, a virtual machine (VM) request command to the first VIM, wherein the VM request command causes the first VIM to obtain a first VM on a first host on the first NFVI and configures the first VM to run on the first host, including configuring virtual machine data for the first VM;
   receiving, by the VNFM from the first VIM, a VM request response, wherein the VM request response comprises information about the configured first VM that the first VIM requested on the first host; and
   subsequent to receiving the VM request response from the first VIM, allocating, by the VNFM, a network service of a virtualized network function (VNF) to the configured first VM, wherein the allocating comprises the steps of:
      sending, by the VNFM, a VM query command to the second VIM, wherein based on the VM query command, the second VIM identifies a second VM, deployed on a second host residing on the second NFVI, that is currently running the network service of the VNF;
      sending, by the VNFM, a service migration command to the VNF to migrate the network service of the VNF, wherein the service migration command, when processed, migrates the network service of the VNF from the second VM to the configured first VM;
      receiving, by the VNFM, a service migration completion notification after the VNF migrates the network service of the VNF from the second VM to the configured first VM; and
      subsequent to receiving the service migration completion notification, releasing, by the VNFM, resources of the second VM.

2. The method according to claim 1,
   wherein the virtual machine query command instructs the second VIM to query information about the second VM that is currently running the network service of the VNF; and
   wherein the service migration command that is sent by the VNFM to the VNF carries the information about the second VM.

3. The method according to claim 1, wherein the first software comprises post-upgrade new-version software and the second software comprises pre-upgrade old-version software.

4. The method according to claim 3, wherein the post-upgrade new-version software and the pre-upgrade old-version software are homogeneous software or heterogeneous software.

5. The method according to claim 1, wherein the sending, by the VNFM, the service migration command to the VNF comprises:
   sending, by the VNFM, the service migration command to an element management system (EMS), so that the EMS forwards the service migration command to the VNF, wherein the EMS is configured to manage the VNF.

6. A service migration method in a network functions virtualization (NFV) architecture, the method comprising:
   receiving, by a virtualized network function (VNF), a service migration command from a virtualized network function manager (VNFM),
      wherein the VNFM determines existence of an idle resource in the NFV architecture, wherein the NFV architecture includes a second virtualized infrastructure manager (VIM) managing a second network functions virtualization infrastructure (NFVI), and the second VIM and second NFVI are running a second software,
      wherein, in response to determining existence of the idle resource, the VNFM installs a first VIM and a first NFVI on the idle resource, wherein the first VIM manages the first NFVI, and the installing includes installing a first software on the first VIM and the first NFVI, and wherein the first software is an upgraded version of the second software,
      wherein the VNFM sends a virtual machine (VM) request command to the first VIM, wherein the VM request command causes the first VIM to obtain a first VM on a first host on the first NFVI and configure the first VM to run on the first host, including configuring virtual machine data for the first VM,
      wherein the VNFM receive a VM request response from the first VIM, wherein the VM request response comprises information about the configured first VM that the first VIM requested on the first host, and
      wherein, subsequent to receiving the VM request response from the first VIM, the VNFM allocates a network service of the VNF to the configured first VM, wherein allocating the network service of the VNF comprises the steps of:
         the VNFM sending a VM query command to the second VIM, wherein based on the VM query command, the second VIM identifies a second VM, deployed on a second host residing on the second NFVI, that is currently running the network service of the VNF, and
         the VNFM sending the service migration command to the VNF, wherein the service migration command further comprises the information about the configured first VM and the configured virtual machine data for the first VM;

migrating, by the VNF according to the service migration command, the network service of the VNF that is currently running on the second VM to the first VM; and sending, by the VNF, a service migration completion notification to the VNFM after the VNF migrates the network service of the VNF from the second VM to the first VM, wherein the VNFM releases resources of the second VM after receiving the service migration completion notification.

7. The method according to claim 6, wherein the receiving, by the VNF, the service migration command from the VNFM comprises:

receiving, by the VNF, the service migration command that is forwarded by an element management system (EMS) from the VNFM.

8. A service migration apparatus in a network functions virtualization (NFV) architecture, the apparatus comprising:
one or more processors;
a transmitter; and
a receiver,
wherein the one or more processors are configured to:
determine existence of an idle resource in the NFV architecture, wherein the NFV architecture includes a second virtualized infrastructure manager (VIM) managing a second network functions virtualization infrastructure (NFVI), wherein the second VIM and second NFVI are running a second software, and
in response to determining existence of the idle resource, install a first VIM and a first NFVI on the idle resource, wherein the first VIM manages the first NFVI, and the installing includes installing a first software on the first VIM and the first NFVI, and wherein the first software is an upgraded version of the second software;
wherein the transmitter is configured to send a virtual machine (VM) request command to the first VIM, wherein the VM request command causes the first VIM to obtain a first VM on a first host on the first NFVI and configures the first VM to run on the first host, including configuring virtual machine data for the first VM;
wherein the receiver is configured to receive, from the first VIM, a VM request response, wherein the VM request response comprises information about the configured first VM that the first VIM requested on the first host;
wherein the one or more processors are further configured to, subsequent to the receiver receiving the VM request response from the first VIM, allocate a network service of a virtualized network function (VNF) to the configured first VM;
wherein the transmitter is further configured to:
send a VM query command to the second VIM, wherein based on the VM query command, the second VIM identifies a second VM, deployed on a second host residing on the second NFVI, that is currently running the network service of the VNF, and
send a service migration command to the VNF to migrate the network service of the VNF, wherein the service migration command, when processed, migrates the network service of the VNF from the second VM to the configured first VM;
wherein the receiver is further configured to receive a service migration completion notification from the VNF after the VNF migrates the network service of the VNF from the second VM to the configured first VM; and
wherein the one or more processors are further configured to, subsequent to the receiver receiving the service migration completion notification, release resources of the second VM.

9. The apparatus according to claim 8,
wherein the VM query command instructs the second VIM to query information about the second VM that is currently running the network service of the VNF; and
wherein the service migration command carries the information about the second VM.

10. The apparatus according to claim 8, wherein the first software comprises post-upgrade new-version software and the second software comprises pre-upgrade old-version software.

11. The apparatus according to claim 10, wherein the post-upgrade new-version software and the pre-upgrade old-version software are homogeneous software or heterogeneous software.

12. The apparatus according to claim 8, wherein the transmitter is configured to send the service migration command to an element management system (EMS), so that the EMS forwards the service migration command to the VNF, wherein the EMS is configured to manage the VNF.

13. A service migration apparatus in a network functions virtualization (NFV) architecture, the apparatus comprising:
a receiver;
a transmitter; and
one or more processors;
wherein the receiver is configured to receive a service migration command from a virtualized network function manager (VNFM),
wherein the VNFM determines existence of an idle resource in the NFV architecture, wherein the NFV architecture includes a second virtualized infrastructure manager (VIM) managing a second network functions virtualization infrastructure (NFVI), and the second VIM and second NFVI are running a second software,
wherein, in response to determining existence of the idle resource, the VNFM installs a first VIM and a first NFVI on the idle resource, wherein the first VIM manages the first NFVI, and the installing includes installing a first software on the first VIM and the first NFVI, and wherein the first software is an upgraded version of the second software,
wherein the VNFM sends a virtual machine (VM) request command to the first VIM, wherein the VM request command causes the first VIM to obtain a first VM on a first host on the first NFVI and configure the first VM to run on the first host, including configuring virtual machine data for the first VM,
wherein the VNFM receives a VM request response from the first VIM, wherein the VM request response comprises information about the configured first VM that the first VIM requested on the first host, and
wherein, subsequent to receiving the VM request response from the first VIM, the VNFM allocates a network service of the service migration apparatus to the configured first VM, wherein allocating the network service of the service migration apparatus comprises the steps of:
the VNFM sending a VM query command to the second VIM, wherein based on the VM query command, the second VIM identifies a second VM, deployed on a second host residing on the second NFVI, that is currently running the network service of the service migration apparatus, and
the VNFM sending the service migration command to the service migration apparatus, wherein the service migration command further comprises the information about the configured first VM and the configured virtual machine data for the first VM;
wherein the one or more processors are configured to migrate, according to the service migration command, the network service of the service migration apparatus that is currently running on the second VM to the first VM; and
wherein the transmitter is configured to send a service migration completion notification to the VNFM after the one or more processors migrate the network service of the service migration apparatus from the second VM to the first VM, wherein the VNFM releases resources of the second VM after receiving the service migration completion notification.

14. The apparatus according to claim 13, wherein the receiver is configured to receive the service migration command that is forwarded by an element management system (EMS) from the VNFM.

15. A service migration server in a network functions virtualization (NFV) architecture, the server comprising:
a memory configured to store program code; and
a processor configured to perform the following steps according to instructions in the program code:
determining existence of an idle resource in the NFV architecture, wherein the NFV architecture includes a second virtualized infrastructure manager (VIM) managing a second network functions virtualization infrastructure (NFVI), wherein the second VIM and second NFVI are running a second software;
in response to determining existence of the idle resource, installing a first VIM and a first NFVI on the idle resource, wherein the first VIM manages the first NFVI, and the installing includes installing a first software on the first VIM and the first NFVI, and wherein the first software is an upgraded version of the second software;
sending a virtual machine (VM) request command to the first VIM, wherein the VM request command causes the first VIM to obtain a first VM on a first host on the first NFVI and configures the first VM to run on the first host, including configuring virtual machine data for the first VM;
receiving, from the first VIM, a VM request response, wherein the VM request response comprises information about the configured first VM that the first VIM requested on the first host; and
subsequent to receiving the VM request response from the first VIM, allocating a network service of a virtualized network function (VNF) to the configured first VM, wherein the allocating comprises the steps of:
sending a VM query command to the second VIM, wherein based on the VM query command, the second VIM identifies a second VM, deployed on a second host residing on the second NFVI, that is currently running the network service of the VNF;
sending a service migration command to the VNF to migrate the network service of the VNF, wherein the service migration command, when processed, migrates the network service of the VNF from the second VM to the configured first VM;
receiving a service migration completion notification after the VNF migrates the network service of the VNF from the second VM to the configured first VM; and
subsequent to receiving the service migration completion notification, releasing resources of the second VM.

16. The server according to claim 15,
wherein the virtual machine query command instructs the second VIM to query information about the second VM that is currently running the network service of the VNF; and
wherein the service migration command sent to the VNF carries the information about the second VM.

17. The server according to claim 15, wherein the first software comprises post-upgrade new-version software and the second software comprises pre-upgrade old-version software.

18. The server according to claim 17, wherein the post-upgrade new-version software and the pre-upgrade old-version software are homogeneous software or heterogeneous software.

19. The server according to claim 15, wherein the processor is further configured to perform the following step:
sending the service migration command to an element management system (EMS), so that the EMS forwards the service migration command to the VNF, wherein the EMS is configured to manage the VNF.

* * * * *